United States Patent
Myller et al.

(10) Patent No.: US 10,101,755 B2
(45) Date of Patent: Oct. 16, 2018

(54) ELECTRICAL ASSEMBLY

(71) Applicant: ABB Technology AG, Zurich (CH)

(72) Inventors: Mikko Myller, Espoo (FI); Kimmo Kohvakka, Helsinki (FI)

(73) Assignee: ABB Schweiz AG, Baden (CH)

( * ) Notice: Subject to any disclaimer, the term of this patent is extended or adjusted under 35 U.S.C. 154(b) by 309 days.

(21) Appl. No.: 15/176,018

(22) Filed: Jun. 7, 2016

(65) Prior Publication Data

US 2016/0363940 A1    Dec. 15, 2016

(30) Foreign Application Priority Data

Jun. 9, 2015  (EP) ..................... 15171192

(51) Int. Cl.

| | |
|---|---|
| *G05D 22/02* | (2006.01) |
| *H02M 7/00* | (2006.01) |
| *G05D 23/19* | (2006.01) |
| *H02J 3/38* | (2006.01) |
| *H02M 7/537* | (2006.01) |
| *H02M 1/32* | (2007.01) |

(52) U.S. Cl.
CPC ............ *G05D 22/02* (2013.01); *G05D 23/19* (2013.01); *H02J 3/383* (2013.01); *H02M 7/003* (2013.01); *H02M 7/537* (2013.01); *H02M 2001/327* (2013.01)

(58) Field of Classification Search
CPC ....... G05D 22/02; G05D 23/19; H02M 7/003; H02M 2001/327; H02M 7/537; H02J 3/383
See application file for complete search history.

(56) References Cited

U.S. PATENT DOCUMENTS

| | | |
|---|---|---|
| 5,934,368 A | 8/1999 | Tanaka et al. |
| 2009/0016408 A1 | 1/2009 | Doan et al. |
| 2010/0243634 A1 | 9/2010 | So et al. |

FOREIGN PATENT DOCUMENTS

| | | |
|---|---|---|
| DE | 102007054215 A1 | 5/2009 |
| DE | 102011106632 A1 | 12/2012 |
| EP | 1993195 A2 | 11/2008 |
| EP | 2582207 A1 | 4/2013 |
| JP | 2012059037 A2 | 3/2012 |
| JP | 2014005947 A | 1/2014 |
| WO | 2002086313 A1 | 10/2002 |
| WO | 2010105647 A1 | 9/2010 |

OTHER PUBLICATIONS

European Search Report, EP 15171192, dated Nov. 16, 2015, ABB Technology AG, 2 pages.
European Written Opinion, EP 15171192, dated Nov. 16, 2015, ABB Technology AG, 2 pages.
SMA Solar Technology AG Opposition dated May 16, 2018; 42 pgs.

*Primary Examiner* — Robert Deberadinis
(74) *Attorney, Agent, or Firm* — J. Bruce Schelkopf; Taft Stettinius & Hollister LLP

(57) ABSTRACT

An electrical assembly comprising a first control system adapted to control a power conversion system, a sensor system adapted to detect conditions relating to the first control system, the conditions comprising temperature and/or humidity, and a heating system adapted to heat the first control system of the electrical assembly. The electrical assembly further comprises a second control system which is adapted to receive information from the sensor system and in connection with turning on the electrical assembly to selectively turn on the first control system and/or the heating system based on conditions relating to the first control system.

20 Claims, 1 Drawing Sheet

ELECTRICAL ASSEMBLY

FIELD OF THE INVENTION

The invention relates to an electrical assembly comprising a control system for controlling a power conversion system and a heating system for heating the control system.

A known electrical assembly has a control system which is adapted to control a heating system and to control a power conversion system by means of software and artificial intelligence. Such a control system provides a versatile and sophisticated way to control the power conversion system.

One of the problems associated with the above electrical assembly is that in connection with turning on the electrical assembly a situation may occur in which temperature of the control system is below an operating temperature range of the control system. In such a situation turning on the heating system requires turning on the control system in a temperature which is harmful for the control system.

BRIEF DESCRIPTION OF THE INVENTION

An object of the present invention is to provide an electrical assembly so as to solve the above problem. The objects of the invention are achieved by an electrical assembly which is characterized by what is stated in the independent claim 1. The preferred embodiments of the invention are disclosed in the dependent claims.

The invention is based on the idea of providing an electrical assembly with a first control system and a second control system such that the second control system is capable of operating in more harsh conditions than the first control system. In connection with turning on the electrical assembly the second control system decides whether conditions are suitable for the first control system. If conditions are not suitable for the first control system, the second control system starts a heating process for heating the first control system.

An advantage of the electrical assembly of the invention is that it can be safely turned on in harsh conditions.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
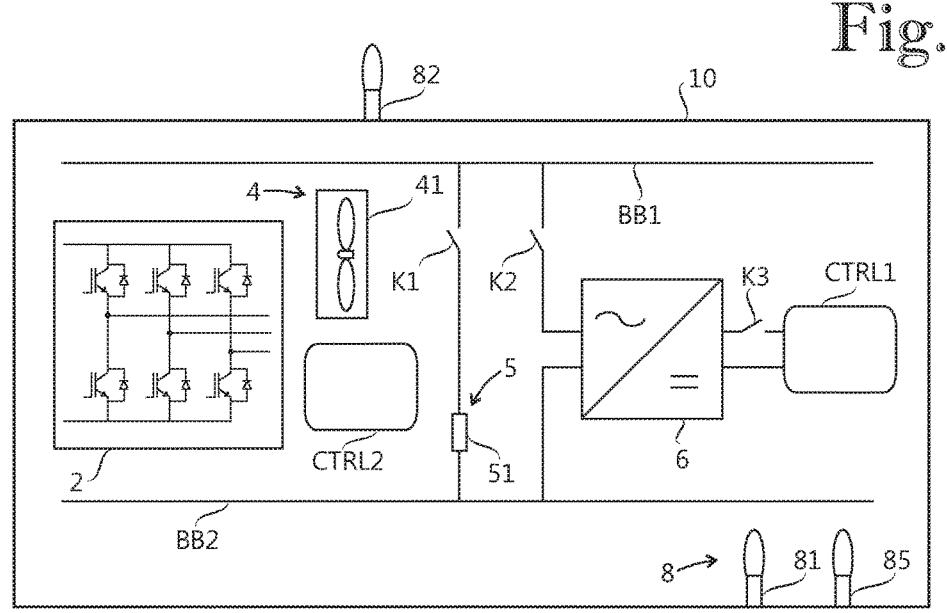
FIG. 1 shows an electrical assembly according to an embodiment of the invention.

FIG. 1 shows an electrical assembly comprising a housing 10, a power conversion system 2, a first control system CTRL1, a second control system CTRL2, a power supply 6, a sensor system 8, a fan system 4 and a heating system 5. The power conversion system 2 is adapted to convert electric energy from one form to another. The first control system CTRL1 is adapted to control the power conversion system 2. The power supply 6 is adapted to supply power to the first control system CTRL1. The sensor system 8 is adapted to detect conditions relating to the first control system CTRL1, the conditions comprising temperature and humidity, and the first control system CTRL1 is adapted to receive information from the sensor system 8. The heating system 5 is adapted to heat the first control system CTRL1.

The power conversion system 2, the first control system CTRL1, the second control system CTRL2, the power supply 6, the sensor system 8, the fan system 4 and the heating system 5 are located inside the housing 10. The heating system 5 is adapted to heat all the devices inside the housing, including the power conversion system 2. In an alternative embodiment, the housing comprises two or more chambers wherein the power conversion system is located in a different chamber than the first control system, and the heating system is adapted to heat the chamber in which the first control system is in. In an embodiment comprising a plurality of chambers a power supply is located in the same chamber with a first control system since both the power supply and the first control system comprise components sensitive to temperature and humidity conditions, wherein it is expedient to detect conditions relating to both the power supply and the first control system with the same sensor system and to heat the power supply and the first control system with the same heating resistor. In yet another embodiment an electrical assembly comprises neither a power conversion system nor housing but is only adapted to be installed in a housing and comprises a first control system adapted to control a power conversion system.

The first control system CTRL1 is a sophisticated system comprising a data processor and software. The first control system CTRL1 further comprises a plurality of capacitors. In an alternative embodiment the first control system comprises artificial intelligence.

The second control system CTRL2 is a simple system adapted to receive information from the sensor system 8 and, in connection with turning on the electrical assembly, to selectively turn on the first control system CTRL1 and/or the heating system 5 based on conditions relating to the first control system CTRL1. The second control system CTRL2 is capable of operating in more harsh conditions than the first control system CTRL1, the more harsh conditions including lower temperature and higher humidity. The second control system CTRL2 is a passive system which does not require an electric supply for operation thereof. A passive second control system may comprise a bimetal thermal switch and a humidity sensing switch including material which expands as a function of humidity. In an alternative embodiment the second control system does require an electric supply for operation thereof and is capable of operating in more harsh conditions than the first control system. In a general case a second control system is capable of operating in more harsh conditions than the first control system, the more harsh conditions including lower temperature and/or higher humidity.

The sensor system 8 comprises a first temperature sensor 81 adapted to detect a temperature relating to the first control system CTRL1, a second temperature sensor 82 adapted to detect ambient temperature present outside the housing 10, and a humidity sensor 85 adapted to detect a humidity relating to the first control system CTRL1. Since the housing 10 comprises only one chamber, the conditions relating to the first control system CTRL1 means conditions inside the housing 10. Locations of sensors adapted to detect conditions relating to the first control system are selected such that the detected conditions represent appropriately the conditions of the first control system.

In alternative embodiments the sensor system is at least partially integrated with the second control system such that the electrical assembly comprises a thermostat or a humidistat. The thermostat is adapted to selectively turn on the first control system and/or the heating system based on a temperature relating to the first control system. The humidistat is adapted to selectively turn on the first control system and/or the heating system based on a humidity relating to the first control system.

In connection with turning on the electrical assembly the second control system CTRL2 is adapted to turn on the first control system CTRL1 if detected conditions relating to the first control system CTRL1 are in the ranges accepted by the second control system CTRL2, and to turn on the heating system 5 if the detected conditions relating to the first control system CTRL1 are outside the ranges accepted by the second control system CTRL2. The accepted conditions comprise a temperature greater than a first temperature limit T1, and humidity lower than a first humidity limit H1.

The first temperature limit T1 is selected such that it is greater than a temperature in which it is safe to turn on the first control system CTRL1. Similarly the first humidity limit H1 is selected such that it is lower than a humidity in which it is safe to turn on the first control system CTRL1. In an embodiment the first temperature limit is selected such that it is 1 to 10° C. greater than a temperature in which it is safe to turn on the first control system, and the first humidity limit is selected such that it is 1 to 10% lower than a relative humidity in which it is safe to turn on the first control system. A relative humidity in which it is safe to turn on the first control system may be in the range of 60 to 95%.

In an alternative embodiment the first temperature limit is selected such that it is equal to the temperature in which it is safe to turn on the first control system, and the first humidity limit is selected such that it is equal to the humidity in which it is safe to turn on the first control system. In such an alternative embodiment the first control system is turned on after a time delay subsequent to reaching the first temperature limit and the first humidity limit. A time delay is useful when the first control system has a significant mass and the sensor system is adapted to detect conditions of air nearby the first control system. Said time delay is adapted to take into account the fact that air warms and dries faster than a control system having significant mass. Naturally a time delay may also be utilized in an embodiment where the first temperature limit is selected such that it is greater than a temperature in which it is safe to turn on the first control system, and the first humidity limit is selected such that it is lower than a humidity in which it is safe to turn on the first control system.

In an embodiment the first control system is more sensitive to temperature and humidity than the power supply. In such an embodiment the first temperature limit may be selected such that it is greater than a lower limit of the operating temperature range of the first control system. Similarly the first humidity limit may be selected such that it is lower than an upper limit of the operating humidity range of the first control system. Therefore the second control system ensures that the first control system is turned on only in conditions suitable for the first control system.

The heating system 5 comprises a heating resistor 51. The heating system further comprises electrical devices that originally were designed for purposes other than heating, such as the power supply 6 and the fan system 4. The second control system CTRL2 is adapted to turn on the power supply 6 and the fan system 4 for heating purposes such that losses of the power supply 6 and the fan system 4 heat inside the housing 10 in a situation where the power supply 6 and the fan system 4 are not required to be on for their original purpose.

A primary function of the fan system 4 is to provide an air flow for cooling the electrical assembly. However, when the fan system 4 is utilized as a part of the heating system 5, the fan system 4 is turned on in a situation where no cooling is necessary. A heating effect of the fan system 4 is based on the fact that substantially the entire input power of the fan system 4 is converted into heat inside the housing 10. Since operating efficiency of a real fan system is always lower than 100% a portion of the input power is inevitably converted into waste heat. Further, as long as the air flow is confined to inside the housing 10, substantially all the energy of the air flow is eventually converted into heat inside the housing 10.

In the embodiment of FIG. 1 the fan system 4 comprises only one fan 41. In an alternative embodiment the fan system comprises a plurality of fans.

The electrical assembly comprises bus bars BB1 and BB2, and switch devices K1, K2 and K3. The bus bar BB1 is adapted to be connected to a phase conductor of an alternating current network, and the bus bar BB2 is adapted to be connected to a neutral conductor of the alternating current network. The switch device K1 is adapted to connect the heating resistor 51 between the bus bars BB1 and BB2. The switch device K2 is adapted to connect the power supply 6 between the bus bars BB1 and BB2. The switch device K3 is adapted to connect the power supply 6 to the first control system CTRL1. The switch device K3 enables the power supply 6 to be utilized as part of the heating system 5. In an embodiment where there is no switch device between the power supply and the first control system it is not possible to utilize the power supply as a part of the heating system since turning on the power supply automatically turns on the first control system.

It is possible to integrate a power supply into a first control system. For example, the first control system may have a circuit board into which the power supply is integrated.

In an embodiment a power supply is adapted to be fed from a direct-current supply, wherein the power supply does not comprise a rectifier.

Further, in an alternative embodiment the first control system does not have any power supply but is adapted to be supplied directly from a direct-current supply or an alternating-current supply. It is also possible to replace bus bars BB1 and BB2 shown in FIG. 1 with suitable feeder conductors of another type.

The first control system CTRL1 is adapted to turn on the heating resistor 51 if a temperature relating to the first control system CTRL1 is less than a second temperature limit T2 or a humidity relating to the first control system CTRL1 is greater than a second humidity limit H2. The first control system CTRL1 is also adapted to utilize the fan system 4 for heating.

The second temperature limit T2 is lower than the first temperature limit T1. Therefore it is quite unlikely that the first control system CTRL1 immediately turns on the heating resistor 51 after the first control system CTRL1 is turned on. If conditions are not too harsh losses of electrical devices that are required to be in ON state are enough to maintain a sufficient temperature for the first control system CTRL1 and there is no need to turn on the heating system. In an alternative embodiment the second temperature limit is equal to the first temperature limit.

The second control system CTRL2 has an active state and an inactive state. In the active state the second control system CTRL2 is adapted to control each of the switch devices K1, K2 and K3. When the electrical assembly has been a long time in OFF state, the second control system CTRL2 is in the active state such that the second control system CTRL2 is able to selectively turn on the first control system CTRL1 and/or the heating system 5.

In the inactive state the second control system CTRL2 is not able to control switch devices K1, K2 and K3. The second control system CTRL2 is adapted to be transferred to the inactive state subsequent to turning on of the first control system CTRL1. In an embodiment the first control system is adapted to transfer the second control system to the inactive state after the first control system is turned on. In an alternative embodiment the second control system is adapted to transfer itself to the inactive state after the second control system has turned the first control system on.

The second control system CTRL2 is adapted to be transferred to the active state subsequent to the first control system CTRL1 is transferred to OFF state. The transfer to the OFF state may take place as a response to a control signal instructing the first control system CTRL1 to transfer to the OFF state, or as a result of power failure during which there is no voltage between the bus bars BB1 and BB2.

In an embodiment the second control system is adapted to be transferred to the active state after the first control system has been in the OFF state for a tolerance time. The tolerance time is a predetermined time smaller than or equal to ten seconds. In alternative embodiments the tolerance time is greater than ten seconds or it is an adjustable time.

The above mentioned tolerance time eliminates an unwanted shutdown of the first control system in a situation where the first control system is in the ON state and a short power failure occurs while conditions relating to the first control system are outside the conditions in which the second control system allows turning on the first control system. Without the tolerance time the second control system would be transferred to an active state and the second control system would turn on the heating system but not the first control system. Consequently the first control system would not be turned on before conditions relating to the first control system would be in the ranges accepted by the second control system. Since the power conversion system is controlled by the first control system, the power conversion system would be in the OFF state until the first control system is restarted.

Each of the first temperature sensor 81, the second temperature sensor 82 and the humidity sensor 85 is adapted to send information both to the first control system CTRL1 and to the second control system CTRL2. In an alternative embodiment the sensor system comprises a first set of sensors adapted to send information to the first control system, and a second set of sensors adapted to send information to the second control system.

Each of the first control system CTRL1 and the second control system CTRL2 is adapted to turn on the heating system 5 if they detect that a difference between a temperature inside the housing 10 and an ambient temperature is less than a predetermined temperature difference limit value. Said predetermined temperature difference limit value may be in the range of 0 to 15° C. Comparing a temperature inside the housing with a temperature outside the housing is an indirect way of detecting potential humidity inside the housing. In alternative embodiments only the first control system or the second control system is adapted to perform above mentioned humidity prevention action.

The power conversion system 2 comprises an inverter for a solar power plant. The solar power plant comprises a photovoltaic cell system adapted to convert energy of light into electricity. In the solar power plant the inverter is adapted to convert direct current produced by the photovoltaic cell system into alternating current. The electrical assembly for the solar power plant is adapted for outdoor use. In an alternative embodiment, a power conversion system comprises a DC-to-DC converter, a frequency converter, or some other assembly adapted to convert electric energy from one form to another.

In harsh conditions a power conversion system may require heating. In an embodiment where the first control system is located in a different chamber than the power conversion system, the first control system is adapted to control heating of the power conversion system after the first control system is turned on.

Figure 2:
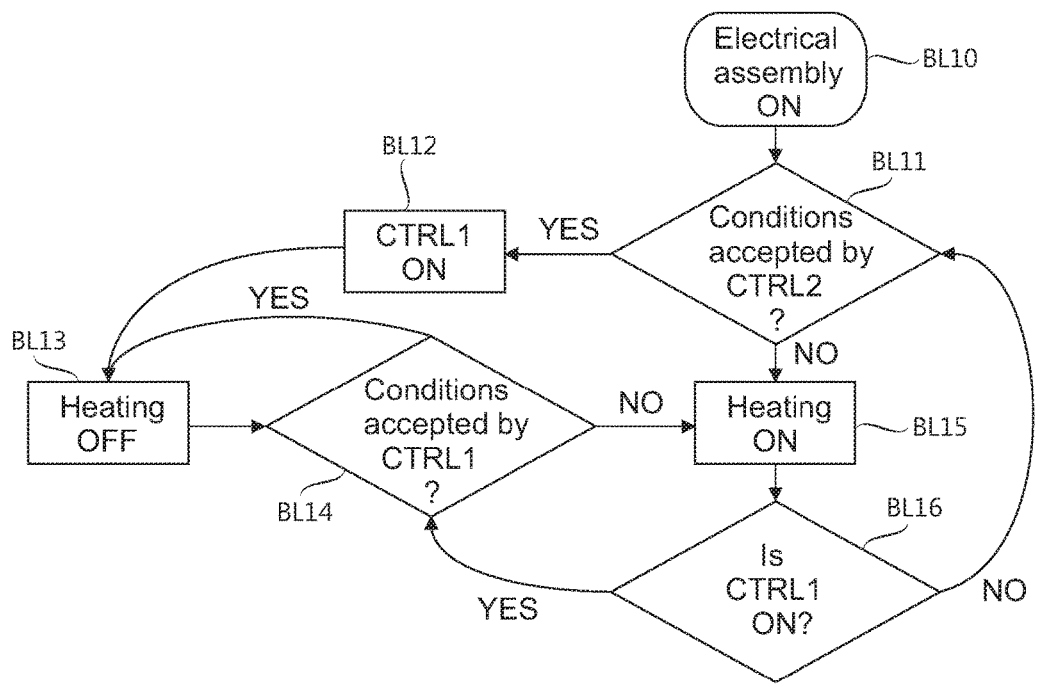
FIG. 2 shows a flow chart describing transitions between different operating states of the electrical assembly of FIG. 1.

FIG. 2 describes transitions of the electrical assembly of FIG. 1 between different operating states in a form of a flow chart. Block BL10 represents turning on of the electrical assembly. In block BL11 the second control system CTRL2 decides whether conditions relating to the first control system CTRL1 are in the ranges accepted by the second control system CTRL2. In block BL12 the second control system CTRL2 turns on the first control system CTRL1. In block BL13 the heating system 5 is turned off provided the heating system 5 is on. In block BL14 the first control system CTRL1 decides whether conditions relating to the first control system CTRL1 are in the ranges accepted by the first control system CTRL1. In block BL15 the heating system 5 is turned on. In block BL16 it is decided whether the first control system CTRL1 is in ON state.

It will be obvious to a person skilled in the art that the inventive concept can be implemented in various ways. The invention and its embodiments are not limited to the examples described above but may vary within the scope of the claims.

The invention claimed is:
1. An electrical assembly comprising:
a first control system adapted to control a power conversion system and requiring an electric supply for operation thereof;
a sensor system adapted to detect conditions relating to the first control system, the conditions comprising temperature and/or humidity, and the first control system being adapted to receive information from the sensor system; and
a heating system (5) adapted to heat the first control system of the electrical assembly;
wherein the electrical assembly further comprises a second control system which is adapted to receive information from the sensor system and in connection with turning on the electrical assembly to selectively turn on the first control system and/or the heating system based on conditions relating to the first control system, the second control system being capable of operating in more harsh conditions than the first control system, the more harsh conditions including at least one of lower temperature and/or higher humidity.

2. An electrical assembly according to claim 1, wherein in connection with turning on the electrical assembly the second control system is adapted to turn on the first control system if the detected conditions relating to the first control system are inside ranges accepted by the second control system, and to turn on the heating system if the detected conditions relating to the first control system are outside ranges accepted by the second control system.

3. An electrical assembly according to claim 1, wherein the second control system is a passive system which does not require an electric supply for operation thereof.

4. An electrical assembly according to any one of claim 1, wherein the sensor system is at least partially integrated with the second control system.

5. An electrical assembly according to claim 4, wherein the electrical assembly comprises a thermostat adapted to selectively turn on the first control system and/or the heating system based on a temperature relating to the first control system.

6. An electrical assembly according to claim 4, wherein the electrical assembly comprises a humidistat adapted to selectively turn on the first control system and the heating system based on a humidity relating to the first control system.

7. An electrical assembly according to claim 4, wherein the electrical assembly comprises a thermostat adapted to selectively turn on the first control system or the heating system based on a temperature relating to the first control system.

8. An electrical assembly according to claim 4, wherein the electrical assembly comprises a humidistat adapted to selectively turn on the first control system or the heating system based on a humidity relating to the first control system.

9. An electrical assembly according to any one of claim 1, wherein the first control system is a sophisticated system comprising software and/or artificial intelligence.

10. An electrical assembly according to any one of claim 1, wherein the heating system comprises at least one heating resistor.

11. An electrical assembly according to claim 10, wherein the first control system is adapted to turn on the at least one heating resistor if the detected conditions relating to the first control system are outside ranges accepted by the first control system.

12. An electrical assembly according to claim 1, wherein the second control system has an active state in which the second control system is able to selectively turn on the first control system and the heating system, and an inactive state, in which the second control system is not able to control the first control system and the heating system, wherein the second control system is adapted to be transferred to the inactive state subsequent to turning on of the first control system.

13. An electrical assembly according to claim 1, wherein the electrical assembly comprises a housing inside which the first control system, the second control system, and the heating system are located.

14. An electrical assembly according to claim 13, wherein the sensor system is adapted to detect ambient temperature present outside the housing, the heating system being adapted to be turned on if a difference between a temperature inside the housing and an ambient temperature is less than a predetermined temperature difference.

15. An electrical assembly according to claim 1, wherein the electrical assembly comprises a power conversion system adapted to convert electric energy from one form to another, the first control system being adapted to control the power conversion system.

16. An electrical assembly according to claim 15, wherein the power conversion system comprises an inverter for a solar power plant.

17. An electrical assembly according to claim 1, wherein the more harsh conditions including lower temperature and higher humidity.

18. A method for preventing humidity in an electrical assembly, the electrical assembly comprising a first control system and a heating system, the first control system being adapted to control a power conversion system and requiring an electric supply for operation thereof, the heating system being adapted to heat the first control system of the electrical assembly, wherein the method comprises:

detecting conditions relating to the first control system, the conditions comprising temperature and/or humidity; and turning on the first control system if the detected conditions relating to the first control system are suitable for the first control system, and turning on the heating system if the detected conditions relating to the first control system are not suitable for the first control system.

19. An electrical assembly comprising:

a first control system adapted to control a power conversion system and requiring an electric supply for operation thereof;

a sensor system adapted to detect conditions relating to the first control system, the conditions comprising temperature and/or humidity, and the first control system being adapted to receive information from the sensor system; and a heating system adapted to heat the first control system of the electrical assembly;

wherein the electrical assembly further comprises a second control system which is adapted to receive information from the sensor system and in connection with turning on the electrical assembly to selectively turn on the first control system and/or the heating system based on conditions detected by the sensor system and relating to the first control system, such that in connection with turning on the electrical assembly the second control system is adapted to turn on the first control system if the detected conditions relating to the first control system are inside ranges accepted by the second control system, and to turn on the heating system if the detected conditions relating to the first control system are outside ranges accepted by the second control system, the second control system being capable of operating in more harsh conditions than the first control system, the more harsh conditions including at least one of lower temperature or higher humidity.

20. An electrical assembly according to claim 19, wherein the more harsh conditions including lower temperature and higher humidity.

* * * * *